US008726363B2

(12) United States Patent
Frank et al.

(10) Patent No.: US 8,726,363 B2
(45) Date of Patent: *May 13, 2014

(54) INFORMATION PACKET COMMUNICATION WITH VIRTUAL OBJECTS

(75) Inventors: Charles William Frank, Irvine, CA (US); Thomas Earl Ludwig, San Clemente, CA (US); William R. Babbitt, Jr., Perris, CA (US); Mark Adams, Los Angeles, CA (US); Nicholas James Witchey, Laguna Hills, CA (US)

(73) Assignee: Rateze Remote MGMT, L.L.C., Wilmington, DE (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/363,368

(22) Filed: Jan. 31, 2012

(65) Prior Publication Data

US 2012/0195315 A1    Aug. 2, 2012

Related U.S. Application Data

(63) Continuation of application No. 12/574,622, filed on Oct. 6, 2009, now Pat. No. 8,387,132, which is a continuation of application No. 11/139,206, filed on May 26, 2005, now Pat. No. 7,620,981.

(51) Int. Cl.
*G06F 9/00* (2006.01)
*G06F 15/16* (2006.01)
*G06F 17/00* (2006.01)

(52) U.S. Cl.
USPC ........................................................ 726/15

(58) Field of Classification Search
USPC ........................................................ 726/15
See application file for complete search history.

(56) References Cited

U.S. PATENT DOCUMENTS

| 4,422,171 A | 12/1983 | Wortley |
| 4,890,227 A | 12/1989 | Watanabe |
| 5,129,088 A | 7/1992 | Auslander |
| 5,193,171 A | 3/1993 | Shinmura |
| 5,444,709 A | 8/1995 | Riddle |
| 5,506,969 A | 4/1996 | Wall |
| 5,546,541 A | 8/1996 | Drew |

(Continued)

FOREIGN PATENT DOCUMENTS

| CN | 1359214 | 7/2002 |
| EP | 0485110 | 5/1992 |

(Continued)

OTHER PUBLICATIONS

Anderson, et al., "Serverless Network File Systems," In Proceedings of the 15th Symposium on Operating Systems Principles, Dec. 1995.

(Continued)

*Primary Examiner* — Dant Shaifer Harriman
(74) *Attorney, Agent, or Firm* — Schwabe, Williamson & Wyatt, P.C.

(57) ABSTRACT

Modules and methods that provide virtual device communication via information packets addressed to the virtual devices. Virtual devices aggregate capabilities of target devices and represent the aggregate as an operational device to remote systems. Physical device elements and virtual devices contained within modules are able to communicate and cooperate over extended distances in a peer-to-peer fashion via a virtual bus tunnel offering addressing and data transport functionality. Such modules and methods can be combined with disk drives to form RAID-like storage structures.

33 Claims, 8 Drawing Sheets

(56) References Cited

U.S. PATENT DOCUMENTS

| | | |
|---|---|---|
| 5,590,124 A | 12/1996 | Robins |
| 5,590,276 A | 12/1996 | Andrews |
| 5,634,111 A | 5/1997 | Oeda |
| 5,742,604 A | 4/1998 | Edsall |
| 5,758,050 A | 5/1998 | Brady |
| 5,771,354 A | 6/1998 | Crawford |
| 5,850,449 A | 12/1998 | McManis |
| 5,867,686 A | 2/1999 | Conner |
| 5,884,038 A | 3/1999 | Kapoor |
| 5,889,935 A | 3/1999 | Ofek |
| 5,930,786 A | 7/1999 | Carino, Jr. |
| 5,937,169 A | 8/1999 | Connery |
| 5,948,062 A | 9/1999 | Tzelnic |
| 5,949,977 A | 9/1999 | Hernandez |
| 5,983,024 A | 11/1999 | Fye |
| 5,991,891 A | 11/1999 | Hahn |
| 6,018,779 A | 1/2000 | Blumenau |
| 6,081,879 A | 6/2000 | Arnott |
| 6,101,559 A | 8/2000 | Schultz |
| 6,105,122 A | 8/2000 | Muller |
| 6,128,664 A | 10/2000 | Yanagidate |
| 6,157,935 A | 12/2000 | Tran |
| 6,157,955 A | 12/2000 | Narad |
| 6,181,927 B1 | 1/2001 | Welling |
| 6,202,060 B1 | 3/2001 | Tran |
| 6,246,683 B1 | 6/2001 | Connery |
| 6,253,273 B1 | 6/2001 | Blumenau |
| 6,259,448 B1 | 7/2001 | McNally |
| 6,275,898 B1 | 8/2001 | Dekoning |
| 6,288,716 B1 | 9/2001 | Humpleman |
| 6,295,584 B1 | 9/2001 | DeSota |
| 6,330,236 B1 | 12/2001 | Ofek |
| 6,330,615 B1 | 12/2001 | Gioquindo |
| 6,330,616 B1 | 12/2001 | Gioquindo |
| 6,377,990 B1 | 4/2002 | Slemmer |
| 6,385,638 B1 | 5/2002 | Baker-Harvey |
| 6,389,448 B1 | 5/2002 | Primak |
| 6,396,480 B1 | 5/2002 | Schindler |
| 6,401,183 B1 | 6/2002 | Rafizadeh |
| 6,434,683 B1 | 8/2002 | West |
| 6,449,607 B1 | 9/2002 | Tomita |
| 6,466,571 B1 | 10/2002 | Dynarski |
| 6,470,342 B1 | 10/2002 | Gondi |
| 6,473,774 B1 | 10/2002 | Cellis |
| 6,480,934 B1 | 11/2002 | Hino |
| 6,487,555 B1 | 11/2002 | Bharat |
| 6,549,983 B1 | 4/2003 | Han |
| 6,553,028 B1 | 4/2003 | Tang et al. |
| 6,567,863 B1 | 5/2003 | Lafuite |
| 6,597,680 B1 | 7/2003 | Lindskog |
| 6,601,101 B1 | 7/2003 | Lee |
| 6,601,135 B1 | 7/2003 | McBrearty |
| 6,618,743 B1 | 9/2003 | Bennett |
| 6,629,162 B1 | 9/2003 | Arndt |
| 6,629,178 B1 | 9/2003 | Smith |
| 6,629,264 B1 | 9/2003 | Sicola |
| 6,636,958 B2 | 10/2003 | Abboud |
| 6,678,241 B1 | 1/2004 | Gai |
| 6,681,244 B1 | 1/2004 | Cross |
| 6,683,883 B1 | 1/2004 | Czeiger |
| 6,693,912 B1 | 2/2004 | Wang |
| 6,701,431 B2 | 3/2004 | Subramanian |
| 6,701,432 B1 | 3/2004 | Deng |
| 6,710,786 B1 | 3/2004 | Jacobs |
| 6,711,164 B1 | 3/2004 | Lee |
| 6,728,210 B1 | 4/2004 | El-Khoury |
| 6,732,171 B2 | 5/2004 | Hayden |
| 6,732,230 B1 | 5/2004 | Johnson |
| 6,741,554 B2 | 5/2004 | D'Amico |
| 6,742,034 B1 | 5/2004 | Schubert |
| 6,754,662 B1 | 6/2004 | Li |
| 6,757,845 B2 | 6/2004 | Bruce |
| 6,772,161 B2 | 8/2004 | Mahalingam |
| 6,775,672 B2 | 8/2004 | Mahalingam |
| 6,775,673 B2 | 8/2004 | Mahalingam |
| 6,795,534 B2 | 9/2004 | Noguchi |
| 6,799,244 B2 | 9/2004 | Tanaka |
| 6,799,255 B1 | 9/2004 | Blumenau |
| 6,826,613 B1 | 11/2004 | Wang et al. |
| 6,834,326 B1 | 12/2004 | Wang |
| 6,853,382 B1 | 2/2005 | Van Dyke |
| 6,854,021 B1 | 2/2005 | Schmidt |
| 6,862,606 B1 | 3/2005 | Major |
| 6,876,657 B1 | 4/2005 | Brewer |
| 6,882,637 B1 | 4/2005 | Le |
| 6,886,035 B2 | 4/2005 | Wolff |
| 6,894,976 B1 | 5/2005 | Banga |
| 6,895,461 B1 | 5/2005 | Thompson |
| 6,895,511 B1 | 5/2005 | Borsato |
| 6,901,497 B2 | 5/2005 | Tashiro |
| 6,904,470 B1 | 6/2005 | Ofer |
| 6,907,473 B2 | 6/2005 | Schmidt |
| 6,912,622 B2 | 6/2005 | Miller |
| 6,917,616 B1 | 7/2005 | Normand |
| 6,922,688 B1 | 7/2005 | Frey, Jr. |
| 6,928,473 B1 | 8/2005 | Sundaram |
| 6,934,799 B2 | 8/2005 | Acharya |
| 6,941,555 B2 | 9/2005 | Jacobs |
| 6,947,430 B2 | 9/2005 | Bilic |
| 6,977,927 B1 | 12/2005 | Bates |
| 6,983,326 B1 | 1/2006 | Vigue |
| 6,985,956 B2 | 1/2006 | Luke |
| 6,993,587 B1 | 1/2006 | Basani |
| 7,039,934 B2 | 5/2006 | Terakado |
| 7,051,087 B1 | 5/2006 | Bahl |
| 7,065,579 B2 | 6/2006 | Traversat |
| 7,069,295 B2 | 6/2006 | Sutherland |
| 7,072,823 B2 | 7/2006 | Athanas |
| 7,072,986 B2 | 7/2006 | Kitamura |
| 7,073,090 B2 | 7/2006 | Yanai |
| 7,111,303 B2 | 9/2006 | Macchiano |
| 7,120,666 B2 | 10/2006 | McCanne |
| 7,145,866 B1 | 12/2006 | Ting |
| 7,146,427 B2 | 12/2006 | Delaney |
| 7,149,769 B2 | 12/2006 | Lubbers |
| 7,152,069 B1 | 12/2006 | Santry |
| 7,181,521 B2 | 2/2007 | Knauerhase |
| 7,184,424 B2 | 2/2007 | Frank |
| 7,188,194 B1 | 3/2007 | Kuik |
| 7,200,641 B1 | 4/2007 | Throop |
| 7,203,730 B1 | 4/2007 | Meyer |
| 7,206,805 B1 | 4/2007 | McLaughlin |
| 7,225,243 B1 | 5/2007 | Wilson |
| 7,237,036 B2 | 6/2007 | Boucher |
| 7,243,144 B2 | 7/2007 | Miyake |
| 7,254,620 B2 | 8/2007 | Iwamura |
| 7,260,638 B2 | 8/2007 | Crosbie |
| 7,263,108 B2 | 8/2007 | Kizhepat |
| 7,278,142 B2 | 10/2007 | Bandhole |
| 7,296,050 B2 | 11/2007 | Vicard |
| 7,333,451 B1 | 2/2008 | Khalil |
| 7,353,266 B2 | 4/2008 | Bracewell |
| 7,389,358 B1 | 6/2008 | Matthews et al. |
| 7,404,000 B2 | 7/2008 | Lolayekar |
| 7,406,523 B1 | 7/2008 | Kruy |
| 7,415,018 B2 | 8/2008 | Jones |
| 7,421,736 B2 | 9/2008 | Mukherjee |
| 7,428,584 B2 | 9/2008 | Yamamoto |
| 7,436,789 B2 | 10/2008 | Caliskan |
| 7,447,209 B2 | 11/2008 | Jeffay |
| 7,463,582 B2 | 12/2008 | Kelly |
| 7,475,124 B2 | 1/2009 | Jiang |
| 7,526,577 B2 | 4/2009 | Pinkerton |
| 7,535,913 B2 | 5/2009 | Minami |
| 7,536,525 B2 | 5/2009 | Chandrasekaran |
| 7,558,264 B1 | 7/2009 | Lolayekar |
| 7,707,304 B1 | 4/2010 | Lolayekar |
| 7,912,059 B1 | 3/2011 | Squire |
| 2001/0020273 A1 | 9/2001 | Murakawa |
| 2001/0026550 A1 | 10/2001 | Kobayashi |
| 2001/0034758 A1 | 10/2001 | Kikinis |
| 2001/0049739 A1 | 12/2001 | Wakayama |
| 2002/0016811 A1 | 2/2002 | Gall |
| 2002/0026558 A1 | 2/2002 | Reuter |

(56) References Cited

U.S. PATENT DOCUMENTS

| | | |
|---|---|---|
| 2002/0029256 A1 | 3/2002 | Zintel |
| 2002/0029286 A1 | 3/2002 | Gioguindo |
| 2002/0031086 A1 | 3/2002 | Welin |
| 2002/0035621 A1 | 3/2002 | Zintel |
| 2002/0039196 A1 | 4/2002 | Chiarabini |
| 2002/0052962 A1 | 5/2002 | Cherkasova |
| 2002/0062387 A1 | 5/2002 | Yatziv |
| 2002/0065875 A1 | 5/2002 | Bracewell |
| 2002/0087811 A1 | 7/2002 | Khare |
| 2002/0091830 A1 | 7/2002 | Muramatsu |
| 2002/0126658 A1 | 9/2002 | Yamashita |
| 2002/0133539 A1 | 9/2002 | Monday |
| 2002/0138628 A1 | 9/2002 | Tingley et al. |
| 2002/0165978 A1 | 11/2002 | Chui |
| 2003/0018784 A1 | 1/2003 | Lette |
| 2003/0023811 A1 | 1/2003 | Kim |
| 2003/0026246 A1 | 2/2003 | Huang |
| 2003/0041138 A1 | 2/2003 | Kampe |
| 2003/0065733 A1 | 4/2003 | Pecone |
| 2003/0069995 A1 | 4/2003 | Fayette |
| 2003/0070144 A1 | 4/2003 | Schnelle |
| 2003/0079018 A1 | 4/2003 | Lolayekar et al. |
| 2003/0081592 A1 | 5/2003 | Krishnarajah |
| 2003/0093567 A1 | 5/2003 | Lolayekar |
| 2003/0101239 A1 | 5/2003 | Ishizaki |
| 2003/0118053 A1 | 6/2003 | Edsall |
| 2003/0130986 A1 | 7/2003 | Tamer |
| 2003/0161312 A1 | 8/2003 | Brown |
| 2003/0172149 A1 | 9/2003 | Edsall et al. |
| 2003/0172157 A1 | 9/2003 | Wright |
| 2003/0182349 A1 | 9/2003 | Leong |
| 2003/0202510 A1 | 10/2003 | Witkowski |
| 2003/0204611 A1 | 10/2003 | McCosh |
| 2004/0047367 A1 | 3/2004 | Mammen |
| 2004/0078465 A1 | 4/2004 | Coates |
| 2004/0088293 A1 | 5/2004 | Daggett |
| 2004/0100952 A1 | 5/2004 | Boucher |
| 2004/0148380 A1 | 7/2004 | Meyer et al. |
| 2004/0160975 A1 | 8/2004 | Frank |
| 2004/0162914 A1 | 8/2004 | St. Pierre et al. |
| 2004/0170175 A1 | 9/2004 | Frank |
| 2004/0181476 A1 | 9/2004 | Smith |
| 2004/0184455 A1 | 9/2004 | Lin |
| 2004/0213226 A1 | 10/2004 | Frank |
| 2005/0033740 A1 | 2/2005 | Cao |
| 2005/0044199 A1 | 2/2005 | Shiga et al. |
| 2005/0058131 A1 | 3/2005 | Samuels |
| 2005/0102522 A1 | 5/2005 | Kanda |
| 2005/0144199 A2 | 6/2005 | Hayden |
| 2005/0166022 A1 | 7/2005 | Watanabe |
| 2005/0175005 A1 | 8/2005 | Brown |
| 2005/0198371 A1 | 9/2005 | Smith |
| 2005/0246401 A1 | 11/2005 | Edwards |
| 2005/0259646 A1 | 11/2005 | Smith et al. |
| 2005/0267929 A1 | 12/2005 | Kitamura |
| 2005/0270856 A1 | 12/2005 | Earhart |
| 2005/0286517 A1 | 12/2005 | Babbar |
| 2006/0029068 A1 | 2/2006 | Frank |
| 2006/0029069 A1 | 2/2006 | Frank |
| 2006/0029070 A1 | 2/2006 | Frank |
| 2006/0036602 A1 | 2/2006 | Unangst |
| 2006/0045089 A1 | 3/2006 | Bacher et al. |
| 2006/0077902 A1 | 4/2006 | Kannan |
| 2006/0101130 A1 | 5/2006 | Adams |
| 2006/0126666 A1 | 6/2006 | Frank |
| 2006/0133365 A1 | 6/2006 | Manjunatha |
| 2006/0168345 A1 | 7/2006 | Siles |
| 2006/0176903 A1 | 8/2006 | Coulier |
| 2006/0182107 A1 | 8/2006 | Frank |
| 2006/0206662 A1 | 9/2006 | Ludwig |
| 2006/0253543 A1 | 11/2006 | Frank |
| 2006/0272015 A1 | 11/2006 | Frank |
| 2007/0043771 A1 | 2/2007 | Ludwig |
| 2007/0083662 A1 | 4/2007 | Adams |
| 2007/0101023 A1 | 5/2007 | Chhabra |
| 2007/0110047 A1 | 5/2007 | Kim |
| 2007/0147347 A1 | 6/2007 | Ristock |
| 2007/0168396 A1 | 7/2007 | Adams |
| 2007/0237157 A1 | 10/2007 | Frank |
| 2008/0181158 A1 | 7/2008 | Bouazizi |
| 2008/0279106 A1 | 11/2008 | Goodfellow |

FOREIGN PATENT DOCUMENTS

| | | |
|---|---|---|
| EP | 0654736 | 5/1995 |
| EP | 0700231 | 3/1996 |
| EP | 0706113 | 4/1996 |
| JP | 63090942 | 4/1988 |
| JP | 09149060 | 6/1997 |
| JP | 10-333839 | 12/1998 |
| JP | 2000267979 | 9/2000 |
| JP | 2001-094987 | 4/2001 |
| JP | 2001-359200 | 12/2001 |
| JP | 2002252880 | 9/2002 |
| JP | 2002318725 | 10/2002 |
| JP | 2004056728 | 2/2004 |
| TW | 223167 | 11/2004 |
| WO | 0101270 | 4/2001 |
| WO | 0215018 | 2/2002 |
| WO | 02071775 | 9/2002 |
| WO | 2004025477 | 3/2004 |

OTHER PUBLICATIONS

Beck, Micah, et al., An End-to-End Approach for Globally Scalable network Storage, ACM SIGCOMM Computer Communication Review; vol. 32, Issue 4, Proceedings of the 2002 SIGCOMM Conference; pp. 339-346; Oct. 2002.

Bruschi, et al., "Secure multicast in wireless networks of mobile hosts: protocols and issues", Mobile Networks and Applications, vol. 7, issue 6 (Dec. 2002), pp. 503-511.

Chavez, A Multi-Agent System for Distributed Resource Allocation, MIT Media Lab, XP-002092534, Int'l Conference on Autonomous Agents, Proceedings of the First Int'l Conference on Autonomous Agents, Marina del Rey, California, US, Year of Publication: 1997.

Gibson, Garth; A Cost Effective High-Bandwidth Storage Architecture; ACM SIGOPS Operating Systems Review, col. 32, issue 5, pp. 92-103; 1998.

Gibson, Garth; File Server Scaling with Network-Attached Secure Disks; Joint Int'l Conference on Measurement & Modeling of Computer Systems Proceedings of the 1997 ACM SIGMETRICS Int'l Conference on Measurement & Modeling of Computer Systems; pp. 272-284; 1997.

IBM Technical Disclosure Bulletin, Vo. 35, No. 4a, pp. 404-405, XP000314813, Armonk, NY, USA, Sep. 1992.

International Search Report for Application No. PCT/US02/40205 dated May 12, 2003.

International Search Report for Application. No. PCTUS05/01542 dated Aug. 25, 2008.

Int'l Search Report/Written Opinion re PCT/US05/18907 dated Jan. 11, 2006.

Kim et al., "Internet Multicast Provisioning Issues for Hierarchical Architecture", Dept of Computer Science, Chung-Nam National University, Daejeon, Korea, Ninth IEEE International Conference, pp. 401-404., IEEE, published Oct. 12, 2001.

Lee et al. "A Comparison of Two Distributed Disk Systems" Digital Systems Research Center—Research Report SRC-155, Apr. 30, 1998, XP002368118.

Lee, et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, pp. 84-92, XP000681711, ISBN: 0-89791-767-7, Oct. 1, 1996.

Lin, et al., "RMPT: A Reliable Multicast Transport Protocol," Proceedings of IEEE INFOCOM '96, vol. 3, pp. 1414-1424, 1996.

Quinn, et al., "IP Multicast Applications: Challenges and Solutions," Network Working Group, RFC 3170, Sep. 2001.

(56) References Cited

OTHER PUBLICATIONS

Robinson, Chad; The Guide to Virtual Services; Linux Journal, vol. 1997 Issue 35; Mar. 1997.

Satran et al. "Internet Small Computer Systems Interface (iSCSI)" IETF Standard, Internet Engineering Task Force, IETF, CH, XP015009500, ISSN: 000-0003, Apr. 2004.

Satran et al., "Internet Small Computer Systems Interface (iSCSI)" Internet Draft draft-ietf-ips-iscsi-19.txt, Nov. 3, 2002.

Virtual Web mini-HOWTO; Parag Mehta; www.faqs.or/docs/Linux-mini/Virtual-Web.html; Jun. 6, 2001.

VMWare Workstation User's Manual, VMWare, Inc., p. 1-420, XP002443319; www.vmware.com/pdf/ms32_manual.pdf; p. 18-21; p. 214-216; p. 273-282; copyright 1998-2002.

WebTen User's Guide; Version 3.0, Jan. 2000; http://www.tenan.com/products/webten/WebTenUserGuide/1_Introduction.html; Jan. 2000.

WebTen User's Guide; Version 7.0; http://www.tenon.com/products/webten/WebTenUserGuide/8_VirtualHosts.html, Chapter 8; Mar. 2008.

Office Action re U.S. Appl. No. 11/139,206 dated Dec. 9, 2008.

Notice of Allowance re U.S. Appl. No. 11/139,206 dated Jul. 13, 2009.

Notice of Allowance re Taiwan Application No. 94127547 dated Sep. 4, 2007.

Notice of Allowance, issued in U.S. Appl. No. 12/574,622, mailed Nov. 13, 2012, 8 pages.

Office Action, issued in U.S. Appl. No. 12/574,622, mailed Mar. 19, 2012, 42 pages.

Office Action, issued in U.S. Appl. No. 12/574,622, mailed May 31, 2012, 41 pages.

Office Action, issued in U.S. Appl. No. 12/574,622, mailed Sep. 13, 2011, 41 pages.

Office Action, issued in U.S. Appl. No. 12/574,622, mailed Apr. 4, 2011, 37 pages.

INFORMATION PACKET COMMUNICATION WITH VIRTUAL OBJECTS

RELATED APPLICATIONS

The present application claims priority to U.S. application Ser. No. 12/574,622 filed Oct. 6, 2009, now U.S. Pat. No. 8,387,132 entitled "Information Packet Communication with Virtual Objects," which claims priority to U.S. application Ser. No. 11/139,206 filed on May 26, 2005 and issued on Nov. 17, 2009 as U.S. Pat. No. 7,620,981, entitled "Virtual Devices and Virtual Bus Tunnels, Modules, and Methods," the entire specifications of which are hereby incorporated by reference in their entirety for all purposes.

FIELD OF THE INVENTION

The field of the invention is virtual device communication.

BACKGROUND OF THE INVENTION

Computing systems and devices from the smallest of embedded systems to the largest of super computers require resources to accomplish their objectives. Possible resources include CPUs, memory, monitors, hard disk drives, networks, peripherals, and a host of other devices that combine to form a complete computing experience for the user. Over the last decade, users of computing systems and devices have become less sophisticated with respect to the complexity of the computing systems. Users are now more concerned with their computing experience rather than in the details of how their computing system operates. The migration of computing systems toward less sophisticated users has pushed such systems to become more and more complex to compensate for the users lack of computer system expertise. The results of this migration can be seen by the continued increase in complexity and power of current operating systems, including Windows® or Linux.

Computers running Windows® or Linux present a single data portal to a user, where the computer contains nearly all aspects of the user's environment including data, applications, preferred settings, and so on. However, many users currently need multiple portals to their computing environment rather than a single system as they travel from home, to abroad, or to work. Not only do users wish to have access to their data as they move, but they also wish to take their computing experience with them. Laptop computers offer the ability to move, but at great expense. Consequently, numerous systems have been developed to enable a more decentralized user experience approach, including web portals such as Yahoo!®, where a user accesses their email interface from anywhere in the world. Users are no longer concerned about the location of their computing resources, but are rather concerned about having access to their data and having the same computing experience no matter where they are or what device they use as an interface.

A number of problems arise due to users' demand for a uniform experience. First, huge computing services including those being developed by Yahoo!™, Microsoft®, and even Google™ require large centralized server systems to house the massive amount of user's data. Such servers are expensive to operate and maintain. Second, users' experiences tend to be limited to the capabilities these services have to offer, (including email, photo organization, web browsing, searching, and so forth), rather than a complete generalized experience. Third, these large centralized systems do not present users with their complete data set, but rather a small fraction of the data. Nor can the systems necessarily run general applications that users desire when working with their data.

In order to address these limitations and provide a cost effective computing experience for users, a fully decentralized approach is required. Some decentralized computing efforts are well known, including for example, Search for Extra-Terrestrial Intelligence (SETI@Home), the Great Internet Mersenne Prime Search (GIMPS), and various file sharing programs such as BitTorrent, and Kazaa. Although average users can access these applications and programs, the applications offer only a limited decentralized user's experience, which focus on specific capabilities or services rather than the generalized computing needs of the user.

Several decentralized computing platforms exist today that are intended to be generalized, including Beowulf Linux clusters and advanced web services including Microsoft.NET. Unfortunately, these and other decentralized computing platforms have several flaws that impact the user. Among other things they require new software that the user must then purchase or license (as in the case of .NET), or write themselves as in the case of clusters. A further problem is that the new software still requires strong centralized computing systems to support the overall computing experience. Such approaches attack the problem from an application or user point of view, which causes the solution space to be too broad. A broad point of view then tends to limit the solution to course grained approach that results in a high cost of implementation to the user.

A better approach to decentralization of computing resources attacks the problem from a more fined grained perspective, where the system scales incrementally in a more cost effective manner rather than at a systems level were incremental costs are high. Rather than approaching the problem from a computing system standpoint, decentralization can be approached from a fundamental computing resource perspective, in which a computing resource distills to the physical device element level (where a device element could include, but not limited to, a CPU, memory, hard disk, or even a monitor). When these devices combine in a decentralized fashion, a wide range of users gain the benefits of decentralization. In addition, decentralization of devices allows devices to focus on doing what they do best and to be responsible for their own services and capabilities; thereby offloading peripheral management work from an operating system and CPU. Consequently, the operating system and CPU can focus on providing more bandwidth to an application. Decentralization also provides the benefit of scalability, such that a computing system scales up at the atomic device level as opposed to at the system level. Users scale their computing systems by purchasing devices which are more cost effective than complete systems. In addition, older generations of decentralized devices still remain useful and contribute to the over computing system without having to be discarded.

Decentralization, by its very nature, includes the concept of virtualization, where devices are distributed over a network but "appear" as locally connected from the perspective of other devices. With device virtualization provided over a network, the computing resources no longer have to be local to the user. This implies a user gains access to their computing experience and resources from any connected location once the user takes appropriate authentication or security measures. Such a decentralized computing system addresses the remaining problems with current architectures: users maintain access to their data, users can use multiple interfaces while maintaining their computing experience, applications do not have to be rewritten because decentralization occurs at the device level rather than the system level, and costs to the user decrease because the user scales their system by purchasing devices at the atomic unit rather than buying at the system level.

Beyond the benefits to the user, decentralization at the device level also creates opportunities for creating new capabilities or services by using decentralized devices as building blocks. Just as devices focus on doing what they do well, new products can be built that aggregate device level capabilities or services into more powerful capabilities or services while maintaining scalability at device level. The new products offer the powerful capabilities or services as a "device" to the rest of the system even though the "devices" are actually virtual in nature. For instance, hard disk drives can be aggregated into a network storage system with RAID capabilities, where the entire storage system appears as a single storage device. The network storage system focuses on storing and retrieving data, without incurring overhead associated with complete system architectures. Because the drives are decentralized and virtualized, the storage system can still be scaled at the atomic level, the hard disk drive, which is much more cost effective to the end user.

To fully realize the benefits and capabilities offered by decentralization, devices and virtual devices need to pass information to each other in an organized way, as if they exist on a virtualized bus. Therefore, there is a need for modules and methods that:

Process information packets addressed to groups of devices, individual devices, or virtual devices;
Includes interfaces to target devices and to some form of network;
Extend device virtual buses over large distances so device can be accessed from any location; and
Manage virtual devices offering aggregated behavior.

Such a set of modules combine with target devices to offer aggregated capabilities, and can also integrate into existing computing systems. When installed in a computing system such as Windows®, the module could take the form of a device driver and the aggregate capabilities or services of the remote target devices appear as a single device.

A number of benefits are realized from this approach. First, computing systems employ such modules to distribute the locality of their physical device elements. This is beneficial in cases where physical security is needed or where geographic isolation offers protection against acts of God. Second, users purchase enhanced capabilities by purchasing computing systems resources in discreet units rather than complete systems. If they wish to double the computing power of their system, the consumer purchases a single CPU (assuming an appropriate module is attached to the CPU) and adds it to the decentralized system. The cost for a single device is much less than the cost of a complete system. Along these lines, old components can be retained and still provide useful capabilities even though they are not as powerful as the new component because the old components can still function within the decentralized system. Third, the customer has access to their experience from anywhere in the world because the virtual system bus extends to any length. Once a user authenticates to their environment, the distributed system presents the user with their preferred experience to them no matter the actual location of the discreet resources housing the user's data. Forth, more complex structures can be created from the discreet device building blocks. For instance, sophisticated RAID structures can be created by using hard drives and appropriately programmed modules attached to the drives. The RAID structures appear as a single drive to the user or the user's applications.

Thus, specific compositions and methods of virtual device communication, information packets transformation, and virtual bus tunnels have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

SUMMARY OF THE INVENTION

The present invention is directed toward virtual devices and information packets used to communicate among virtual devices, where the information packets are addressed to virtual devices. Virtual devices contained within modules coordinate with other virtual devices within other modules in a peer-to-peer fashion to offer aggregated capabilities. Information packets comprise host addresses of virtual devices and comprise identifiers (IDs). IDs comprise sufficient information for routing the packets over a network to a final destination and comprise sufficient information to determine how the information held within the packet should be conveyed to a physical target device. Modules comprising virtual devices and the ability to create information packets offer a virtual bus tunnel for virtual devices so they can coordinate behavior in a distributed fashion forming. Various embodiments of such modules offer a number of interesting features that allows devices, either local or remote with respect to the target devices, to offer aggregate capabilities to device users than the users would ordinarily have access to at the device level. Modules capabilities include, but not necessarily limited to, distributed data storage systems.

Virtual Devices

In our own prior art we disclosed physical device elements, (i.e. hardware devices) that don't have a unique frame address but do have a host address. Specific examples included disk partitions within a hard drive, RAM, or CPUs. We also disclosed and claimed protocols, methods and systems for using the host addresses to access the physical device elements.

As used herein, the term "virtual device" means anything (hardware, firmware, or software during its execution) that has a host address, but doesn't have a unique frame address, through which to represent itself as an operational device to an external application. A host address is any physical interface independent address, and includes, for example, IP addresses, IPv4 addresses, and IPv6 addresses. Host addresses are also considered herein to include domain names and URLs (web page addresses) because they resolve to a network address based on applications or protocols. A frame address is a physical media interface address within a packet that frames a host address. For example, in Ethernet a frame address includes a MAC address, in Frame Relay a frame address includes the DLCI or the LAN adapter address, and in ATM a frame address includes an AES address. USB usually uses frame addresses, but can also use packets that do not have frame addresses.

Network addressable virtual devices are virtual devices that are addressed at the network level of the OSI model, as opposed for example, to the session, presentation, or application level. Thus, a mapped Windows® drive is addressed at the application level, and therefore would be virtual device, but not a network addressable virtual device. On the other hand, assume that a physical disk drive has partitions $P_1$-$P_n$. Partition P1 can be a network addressable virtual device using techniques disclosed herein, and it would be a physical device element. A logical partition mapping data block addresses to partition $P_1$ disk locations can also be a network addressable virtual device, but it would not be a physical device element because the mapping of the data blocks to physical disk locations can be arbitrary. A logical group $G_1$ consisting of several logical partitions $P_1$-$P_m$ can also be a network addressable virtual device, and a logical volume $V_1$ consisting of several logical groups $G_1$-$G_o$ can also be a virtual device. Of course, neither the logical group $G_1$ nor the logical volume $V_1$ would be physical device elements. Therefore, a collection of network addressable virtual devices can also be considered a network addressable virtual device. Consequently, within this document "virtual device" can refer to both a single virtual device and to a collection of network addressable virtual devices working together.

In preferred embodiments, virtual devices comprise functionality such that the virtual devices can offer remote applications, users, or other devices access to aggregated capabilities of the physical target devices. Such virtual devices do not necessarily have to have a one-to-one correspondence to target devices, but these and other virtual devices do have to represent themselves as operational devices to external applications. For example, an independently addressable logical partition on a disk drive that responds properly to read and write requests based on logical block addresses would be considered a virtual device. Virtual devices also comprise any software construct or functionality including a function, application, program, service, device driver, task, process, thread, or other non-physical device elements. Those skilled in the art of firmware or software development will recognize that a virtual device is a logical construct. Consequently, numerous coding structures for virtual devices are possible including structures that represent multiple virtual devices.

Although multiple virtual devices can share a single frame address, each virtual device within a system must have its own host address to avoid conflict. This is somewhat analogous to "multi-homing" where an individual computer can have multiple IP addresses and multiple network interfaces. But the similarity is not perfect because multi-homing assigns IP addresses only to the physical network interfaces, and not to sets of functionalities as represented by applications or programs. In addition, the multiple IP addresses are usually from different sub-nets to ensure link redundancy should a route fail. Still another difference from multi-homing is the sheer number of addresses available. Because virtual devices can share frame addresses, there may be tens, hundreds, or thousands of addresses. Multi-homed systems usually have only two or three addresses.

In a particularly simple embodiment, a virtual device can merely be an electronic front end to a physical disk drive that includes for example, a processing unit (CPU) and other computer chips, an electronic network interface, an electronic disk drive interface, random access memory (RAM), a printed circuit board (PC board), a power supply, and interconnecting wires or traces. In a more sophisticated embodiment, a virtual device can be a software driver or application, which would of course have to reside on a machine readable memory, and execute on some form of physical processing unit. Non-operating software would not typically have a host address and therefore would not be considered a virtual device.

In still another aspect it is contemplated that one could write software that would execute on a computer or other hardware as a virtual device. From that perspective the inventive subject matter includes methods of writing such software, recording such software on a machine readable medium, licensing, selling, or otherwise distributing such software, installing, and operating such software on suitable hardware. Moreover, the software per se is deemed to fall within the scope of the inventive subject matter.

Information Packets

As used herein an "information packet" is any packet passing through a virtual device containing information. An information packet can include an ID in a split-ID format, a contiguous-ID format, or a device format.

Modules

As used herein, the term "module" means any combination of hardware, software, or firmware that provides: (a) a target device interface; (b) network interface; and (c) packet processor. Packet processor can include a virtual device manager, a virtual device, and a virtual bus tunnel. In instances where the module includes software, the software will, of course, reside at least temporarily on a machine-readable memory, and execute on a processing unit of an electronic device, but either or both of the machine-readable memory and the processing units can be external to the module.

Virtual Device Management

Virtual device management refers to the capability of a module to manage virtual devices within the module that appear to be real devices external to the module, where management comprises all aspects relating to controlling the existence or behavior of the virtual device constructs. It is contemplated that management comprises functionality to create, to destroy, to suspend, to resume, to modify, to secure, or other related functionality.

Virtual Bus Tunnel

In order for the virtual devices to offer their capabilities or render a service to remote systems, the virtual devices need some form of communication bus. Because the virtual devices do not comprise physical interfaces, they need a mechanism for addressing other virtual devices as well as transporting data to the other devices, wherein the mechanism is referred to as a "virtual bus tunnel." The virtual bus tunnel provides virtual devices the ability to communicate or coordinate their behaviors over extended physical distances such that a collection of devices working together do not necessarily have to be physically located near each other. Furthermore, the virtual bus tunnel allows for packet level communication among physical device elements and virtual devices addressable on the virtual bus tunnel. Communication over the virtual bus tunnel can also include direct communication from an application to virtual devices.

Normal physical buses suffer from bus contention where devices must vie for access to the bus. Virtual bus tunnels resolve contention by grouping virtual devices logically with a group ID such that multiple groups access the same physical transport media without contending for the bus by using the group ID within their packets. Each group ID represents a single logical group of virtual devices sharing a single bus with other logical groups each with their own ID. In addition, each virtual device is individually addressable via its own device ID. It is specifically contemplated that an Internet Protocol network embodies a virtual bus tunnel utilizing IP addresses as host addresses representing device IDs for virtual devices. Under such an embodiment, group IDs can be managed via IP multicasting addresses such that applications, users, or other devices that are members of the group perceive the group as a single device. Because the virtual bus tunnel can offer capabilities including quality of service management, it too can be considered a virtual device and can be addressed via a host address.

Peer-to-Peer Coordination

Virtual devices also need the ability to work together in a coordinated fashion to reach their full potential in providing aggregated capabilities or services. Peer-to-peer communication allows for devices to communicate directly with each other without using multicast where all devices within the multicast group "see" the traffic. Peer-to-peer coordination further provides for virtual devices to be aggregated into yet more powerful capabilities or services. In addition, it is contemplated that modules can be deployed into applications such that the applications have the ability to access the capabilities or services that virtual devices offer. Consequently, modules can be implemented as hardware systems attached to devices or software drivers installed on workstations running operating systems where the virtual devices within each module are programmed to work together in a peer-to-peer fashion.

The teachings herein can be advantageously employed by product developers to create systems where modules coupled with devices or components provide aggregated capabilities or services to multiple applications, users, or other devices in a distributed fashion. Devices that can be enhanced via such modules include hard disk drives, memory, monitors, patient sensors, point of sales scanners, office equipment, building automation sensors, media players, handheld systems, home entertainment systems, or computers. In addition, the modules can be integrated into software applications (if the module comprises all software components), formed into a rackmount system containing numerous devices including hard disk drives, or single modules attached to a single device. Modules can even be sold as a stand alone product.

Various objects, features, aspects, and advantages of the present invention will become more apparent from the following detailed description of the preferred embodiments of the invention, along with the accompanying drawings in which like numerals represent like components

DETAILED DESCRIPTION

Virtual devices communicate with remote systems via information packets over a virtual bus tunnel. The information packets originate from a source who wishes to address an entity and direct data to the entity, where an entity on virtual bus tunnel comprises a virtual device. The entity can appear as a single "device" from the perspective of the source.

Figure 1A:
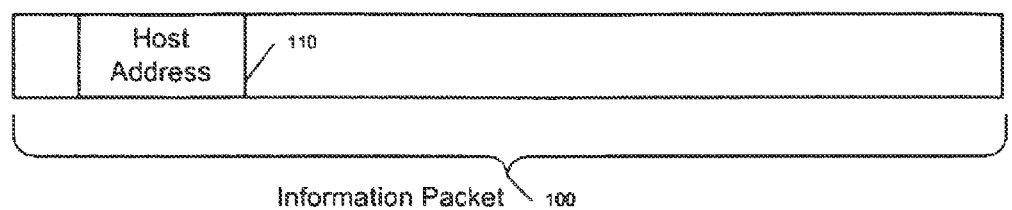
FIG. 1A is a schematic of an unframed information packet in which the host address is an address of a virtual device other than a physical device element.
Figure 1B:
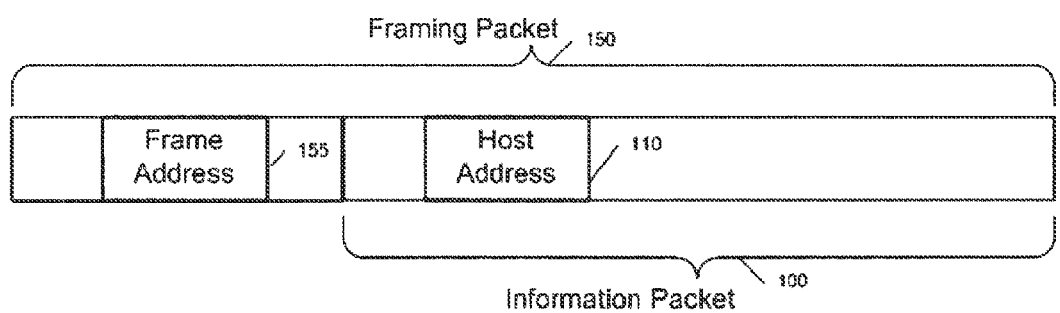
FIG. 1B is a schematic of a framed information packet including the host address of FIG. 1A.

FIG. 1A illustrates an information packet addressed to a virtual device that is not a physical device element. Information packet 100 comprises a host address 110 used to address a virtual device. Preferred host addresses include routable addresses. Examples of routable addresses including IPv4 address or IPv6 addresses. Consequently, software or firmware employed to create information packets has sufficient intelligence to distinguish the difference between virtual devices, physical device elements, or target devices in order to properly address virtual devices and the capabilities they represent. FIG. 1B illustrates a framed version of the information packet of FIG. 1A. Framing packet 150 comprises frame address 155 and encapsulated information packet 100. An example framing packet includes an Ethernet packet where the MAC addresses corresponds to frame addresses.

Preferred types of information packets include packets utilizing a split-ID format, contiguous-ID format, or device format, where an ID comprises sufficient information for determining where the packets should go or how a packet should interact with a final target device.

IDs

Within the context of an information packet, packets comprise IDs that contain all necessary information for routing the packets to a correct entity comprising a module, object within a module, a device, or virtual device. IDs comprise at least three sub-IDs which include group IDs, device IDs, or target IDs. Group IDs identify a logical grouping of entities such that the logical group can be addressed via a single ID. Using an IP address as a group ID allows multiple entities to be addressed as if they are a single "device." Device IDs identify specific entities in a group. It is contemplated that specific entities comprise non-physical objects including virtual devices. Target IDs identify a specific entity's capability or characteristic.

Split-ID Format

Figure 2A:
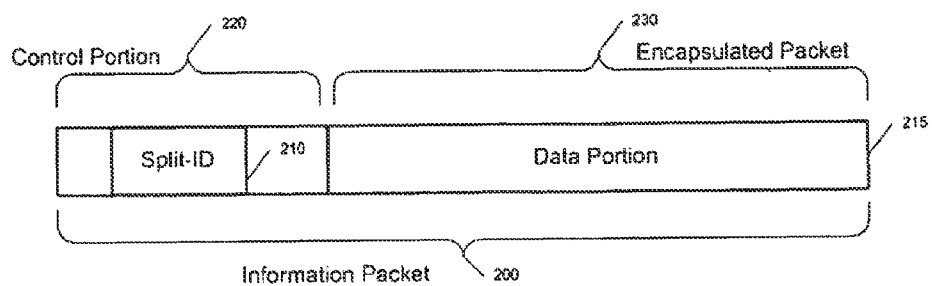
FIG. 2A is a schematic of a possible embodiment of an information packet utilizing a split-ID format.

FIG. 2A depicts an embodiment of a split-ID format within an information packet. Referring to FIG. 2A, information packet 200 comprises several smaller portions, control portion 220 and data portion 215. Nominally, a module uses control portion 220 to determine how to control a packet including figuring out to which entity within the module, if any, the packet should be routed. Data portion 215 comprises an encapsulated packet 230 that can be further used by the module or the entity to determine the final disposition of the information within the packet.

Although FIG. 2A displays a contiguous ID segment in the control portion of each packet and encapsulated packet, it is contemplated that any arrangement or number of ID segments within the control portion or data portion of a packet such that the complete ID information can be reconstructed falls within the scope of the split-ID concept. In addition, the control portion of a packet does not necessarily have to appear at the beginning of a packet, but could reside anywhere within a packet.

Figure 2B:
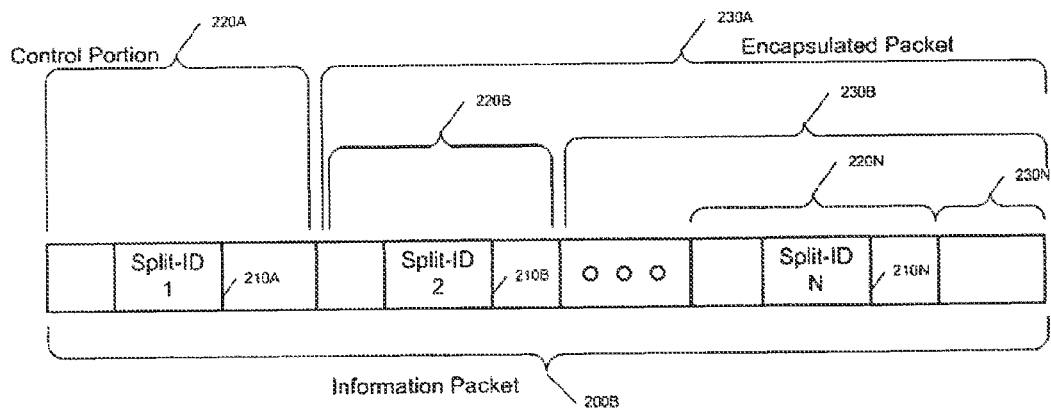
FIG. 2B is a schematic of an alternative embodiment of an information packet utilizing a split-ID format.

FIG. 2B fully represents a split-ID, where information packet 200B has a plurality of encapsulated packets within its data portion. Encapsulated packet 230A further comprises control portion 220B and an encapsulated packet 230B. As shown, the nesting of encapsulated packets is arbitrary. However, the complete ID of information packet 200B comprises split-ID 210A through split-ID 210N. Therefore, "split-ID" refers to the ID of the packet being split among encapsulated packets. One should note each piece of the ID is not necessarily related to the other pieces of the ID. In some embodiments, one part of the ID represents a group ID or device ID comprising routable address information and other ID pieces represent target ID comprising information relating to the physical structure of a target device. In some cases, group IDs comprise tags or names for easier management. In more preferred embodiments, the routable addresses comprise IP addresses assigned to storage areas and other ID pieces comprise Logical Block Addresses (LBAs) associated with logical partitions that map the LBAs to disk partition locations.

Continuous-ID Format

Figure 3:
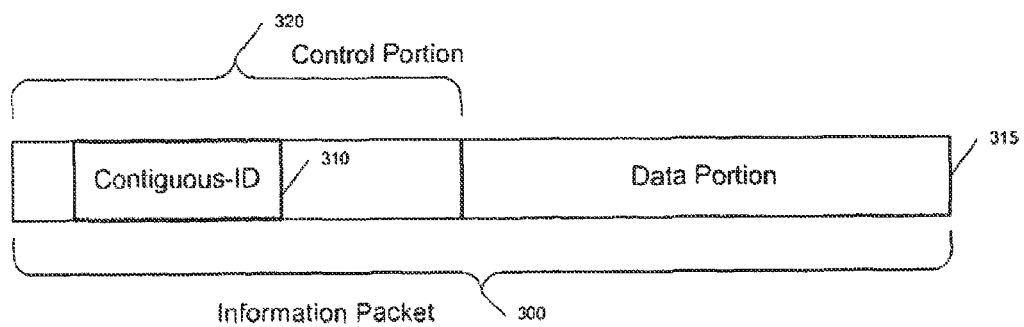
FIG. 3 is a schematic of a possible embodiment of an information packet utilizing contiguous-ID format.

Information packets using a split-ID format represent a more preferred approach for addressing and for data transport using modules; however, other approaches are also possible. FIG. 3 illustrates information packet 300 comprising a control portion 320 and data portion 315. Control portion 320 further comprises single contiguous-ID 310, where contiguous-ID 310 comprises information for the module to resolve the final disposition of the packet. Contiguous-ID 310 is formed by having all the ID information contained in one unit of data. It is contemplated that contiguous-ID 310 comprises host addresses including IP addresses where the IP address can also map to a device specific characteristic. It is more specifically contemplated that contiguous-ID 310 comprises an IPv4 or IPv6 address that maps directly to an LBA of a logical partition that maps to a disk drive partition. Contiguous-IDs comprise the elements of a group ID, device ID, or target ID.

FIG. 3 displays control portion 300 at the beginning of packet 320. One should note the placement of control portion does not necessarily have to be at the beginning of the packet, but could reside anywhere within the packet. Furthermore, more than one contiguous-ID can be present within packet 320.

Device Format

Information packets using device formats represent data packets received from a target device or sent to a target device. Contemplated packets are raw packets with no additional formatting added to them such that a target device perceives the packets as a naturally presented packet for the target device's interface. Information packets using device formats are device specific, consequently, they can vary from module to module depending on what types of target devices attach to the modules. In some embodiments, a module can be able to handle many different types of device formats directed toward a heterogeneous mix of target devices.

Aggregated Capabilities

Figure 4:
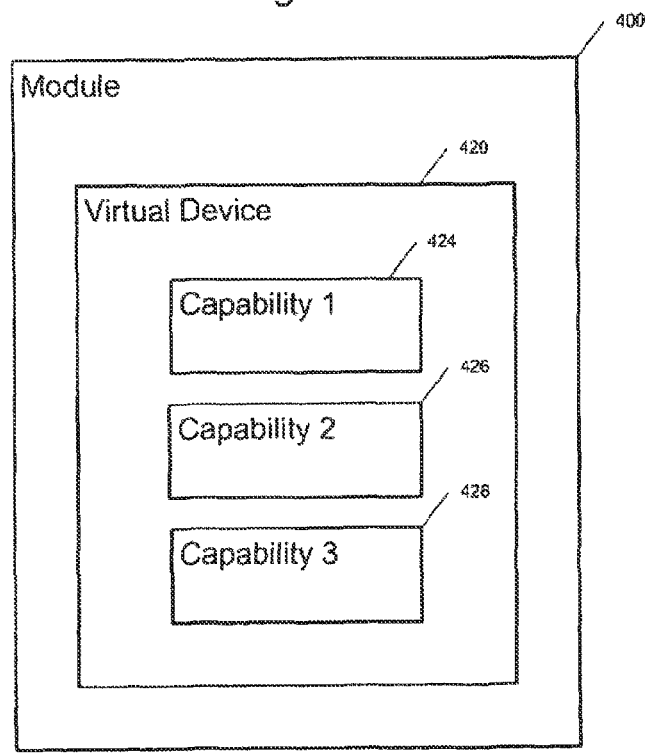
FIG. 4 is a schematic of a virtual device that aggregates capabilities

FIG. 4 illustrates the aggregation of a set of capabilities. Module 400 comprises virtual device 420 that aggregates a set of capabilities 424, 426, and 428. Capabilities 424, 426, and 428 comprise capabilities programmed into virtual device 420 or capabilities of target devices accessible to virtual device 420. Contemplated virtual devices include logical drive partitions that aggregate the data storage capabilities across multiple hard disk drives. Even though FIG. 4 shows three capabilities, a virtual device aggregates any number of capabilities. In addition, it is contemplated that the capabilities can comprise a heterogeneous mix of capabilities.

Module Capabilities

Figure 5:
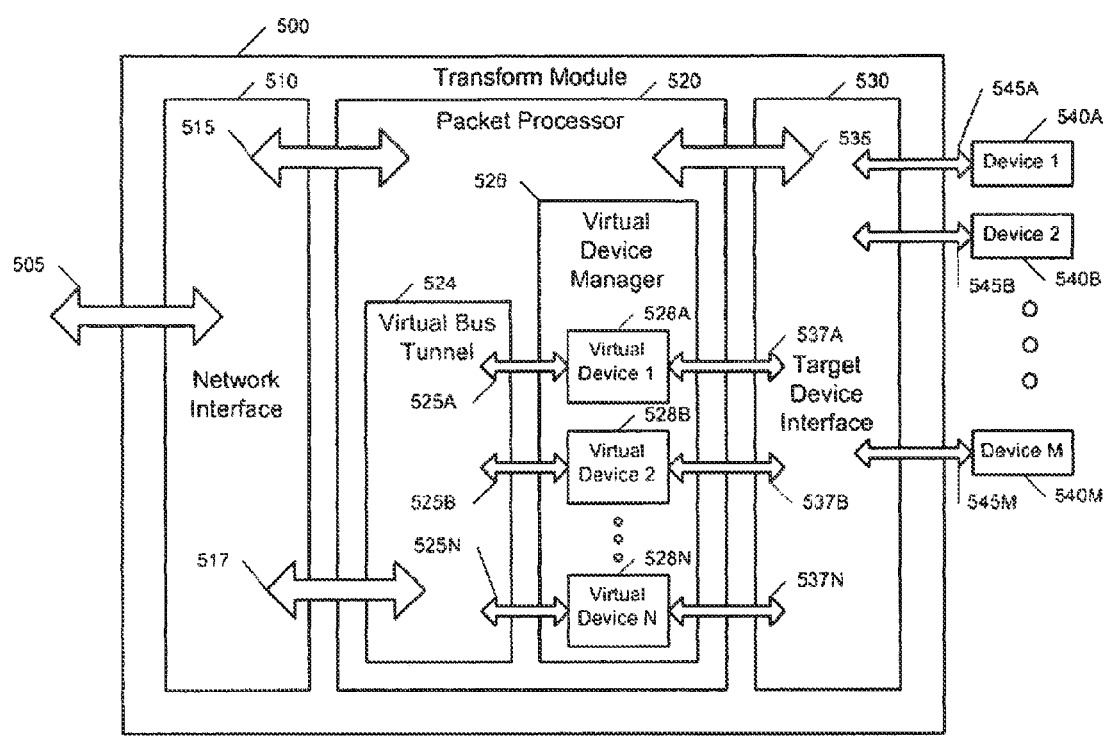
FIG. 5 is a schematic of a block level logical representation of a module.

FIG. 5 illustrates a logical block diagram of a possible module 500 capable of creating information packets addressed to virtual devices used to communicate with remote systems. Module 500 comprises network interface 510, packet processor 520, and target device interface 530. Network oriented data path 505 flows bi-directionally to and from network interface 510. Packet data path 515 also flows bi-directionally to and from network interface 510 and packet processor 520. In addition device data path 535 flows bi-directional between packet processor 520 and target device interface 530. Target device interface 530 provides for physically handing packets from module 500 to a number of target devices. It is contemplated the number of target devices can vary from one to an arbitrary number as represented by devices 540A through 540M. When target device interface 530 interacts with target devices 540A through 540M, the device data passes through target device data paths 545A through 545M that correspond to their respective target devices.

Packet processor 520 comprises the capability for processing the various types of information packets including packets with split-ID, contiguous-ID, or device formats. In order to process the packets, packet processor further comprises virtual device manager 526 and virtual bus tunnel 524 both of which represent further functionality for packet handling. Both of these elements are under the command and control of packet processor 520. Virtual device manager 526 further comprises at least one of a possible plurality of virtual devices 528A through 528N. It is contemplated that the number of virtual devices can vary as shown depending on the requirements of module 500. Virtual devices 528A through 528N each have a bi-directional device data path 537A through 537N, respectively, providing access to target devices 540A through 540M. In addition, virtual devices 528A through 528N each have a bi-directional packet data path 525A through 525N respectively used to access virtual bus tunnel 524. Virtual bus tunnel 524 provides the virtual devices a communication path 517 to other modules, virtual devices, or system external to module 500 via network interface 510. Contemplated data paths within the module include Application Program Interfaces (APIs), memory copies, Inter-Process Communications (IPCs), physical connections, or other data transfer mechanisms.

FIG. 5 represents a logical view of the roles and responsibilities within module 500. In practice the logical constructs can be combined together in various ways that best suite the desired implementation. For instance, each logical block separated into individual tasks or threads, or all the blocks could be combined into a single monolithic executable image.

Network Interface

Network interface 510 has responsibilities comprising providing network oriented data path 505 from module 500 to remote modules and systems that desire access to the capabilities or services offered by module 500 and the objects it manages. It is contemplated that preferred embodiments of network interface 510 comprise use of an internetworking protocol to manage communication. In more preferred embodiments of network interface 510, the internetworking protocol comprises IPv4 or IPv6. In addition, because module 500 can be placed in a general purpose computing system and function as driver level software, network interface 510 is contemplated to comprise an API that provides access to the general purpose computing system's network port. It is also contemplated communications with entities external to module 500 can be secured with respect to confidentiality, integrity, or authentication.

Packet Processor

Packet processor 520 represents a logical group of capabilities to handle information packet handling and to govern some of module 500 main aspects. In preferred embodiments, packet processors contains any combination of hardware, software, or firmware necessary to assign host addresses to various objects associated with module 500, to take action on the information packets passing through network interface 510 or target device interface 530, or to process information packets at rates up to the line-rate of network interface 510 or the line-rate of target device interface 530. Packet processor 520 assigns host addresses to module 500 objects including target devices 540A through 540M, virtual devices 528A through 528N, module 500 itself, virtual bus tunnel 524, logical groups of module objects, or other real or virtual objects associated with module 500. When packet processor 520 takes action on information packets traveling through module 500, information packets are converted among the various types of ID packets. The packets contain the necessary information for routing to other systems as well as the data for the other systems to properly process the packets. Therefore, specific goals or rules employed by module 500 govern the actions taken on the information packets. Preferred embodiments of packet processor 520 comprise the capability of communicating with other modules. Yet even more preferred embodiments of packet processor 520 comprise the capability of communicating with other modules, where the other modules are separated from module 500 by routers.

In order to facilitate communications with other modules, a preferred embodiment of packet processor 520 further comprises the ability to acquire a plurality of host addresses from internal module resources or from external modules resources. Once acquired, the host addresses can be assigned by packet processor 520 to various module objects. To further facilitate communications, preferred host addresses comprise routable addresses such that systems external to the module determine how to route the information packets containing the host addresses to a final destination. Furthermore, a more preferred version of packet processor 520 comprises a routable node with respect to the routable addresses. Such a packet processor comprises the capability of routing packets with host addresses to internal objects as well as to external objects. In addition host addresses can comprise addressable names used to reference objects, where contemplated names include names that can be used by DNS systems to resolve specific host addresses. Furthermore, for localized systems that do not have access to DNS, a local name resolution system is contemplated, preferably a peer-to-peer mechanism. More preferred host addresses comprise IPv4 or IPv6 addresses.

As a preferred packet processor 520 operates on information packets, it is contemplated that the results of taking action on the packets yield no out-going packets or at least one out-going packet. The case of no out-going packets provides for silently discarding packets not destined for any object within module 500. Contemplated uses for silently discarding include using IP multicasting to communicate with a logical group of objects providing an aggregate set of capabilities or services where information packets are sent to all objects in the group, but only one target object needs to respond and all others can silently discard the information packet. The case of at least one out-going packet provides for transforming from one type of packet to another and for routing packets to their final destination. An even more preferred embodiment of packet processor 520 provides capabilities comprising packets processing uni-directionally, multi-directionally, or for returning packets backward from whence they came. Contemplated uses for uni-directional processing include accepting information packets destined for target devices and transforming the packets to device format. The packets are then delivered directly to a target device. Contemplated uses for multi-directional processing include sending packets to a target device as well as sending a possible acknowledgement to a remote source. In addition, contemplated uses for returning backward packets include responding with an error if information packets can not be processed properly.

Packet processor 520 also comprises additional contemplated functionality including configuring target devices 540A through 540M, configuring target device interface 537, managing virtual bus tunnel 524, or managing virtual device manager 526. Packet processor 520 further comprises virtual bus tunnel 524 and virtual device manager 526. Virtual bus tunnel 524 provides a conduit for virtual devices 528A through 528N used for communication with other systems external to module 500. Virtual device manager 526 comprises sufficient software for controlling and managing virtual devices 528A through 528N. Both the virtual device manager and virtual bus tunnel will be discussed in more detail in following sections.

Target Device Interface

Target device interface 530 comprise a layer of functionality providing the logical blocks within module 500 access to target devices 540A through 540M. Contemplated target device interfaces include homogenous interfaces where all the target devices are of the same type or class, or heterogeneous interfaces where at least some of the target devices are different from the other target devices. Specifically contemplated homogenous interfaces include hard disk drive interfaces. Contemplated heterogeneous interfaces comprise various device level interfaces including DMA for low level devices, peripheral ports, APIs, or user interface ports.

Virtual Device Manager

Preferred versions of virtual device manager 526 comprise the capability for managing virtual devices 528A through 528N and functionality for mapping virtual devices to the capabilities or characteristics of target devices 540A through 540M. Within this context managing implies virtual device manger 526 has complete control over the existence or behavior of the virtual devices including the capability to create, destroy, modify, suspend, or resume operation of the virtual device.

Virtual Devices within a Module

Virtual devices 528A through 528N can be advantageously implemented through software constructs including programs, tasks, threads, processes, or monolithic coding systems. Each virtual device does not necessarily map to a target device in a one-to-one fashion. In addition, virtual devices do not necessarily have to correspond to any capability or characteristic of any of the target devices. In preferred embodiments at least one virtual device maps its functionality to a set of target devices including rotating or non-rotating media. Specifically contemplated non-rotating media includes all possible forms of memory. Specifically contemplated rotating media includes hard disk drives, optical drives, or other yet to be conceived rotating media. In the case of rotating media comprising hard disk drives, virtual devices 528A through 528N are contemplated to be logical partitions mapped to storage areas on the hard disk drive.

For modules to be deployed in existing computer systems including Windows® or Linux, preferred virtual devices are most advantageously implemented as drivers, threads, or processes. For self contained modules to be attached physically to target devices, virtual devices are advantageously implemented as tasks on embedded operating systems. In addition, it is contemplated that virtual devices can represent components other than target device capabilities including functions which can serve as remote event handlers for a decentralized computing system. Under such a contemplated virtual device, the host address associated with virtual devices becomes an event handler ID which can take the form of an IP address, port assignment, or memory address.

Module Implementation

Figure 6:
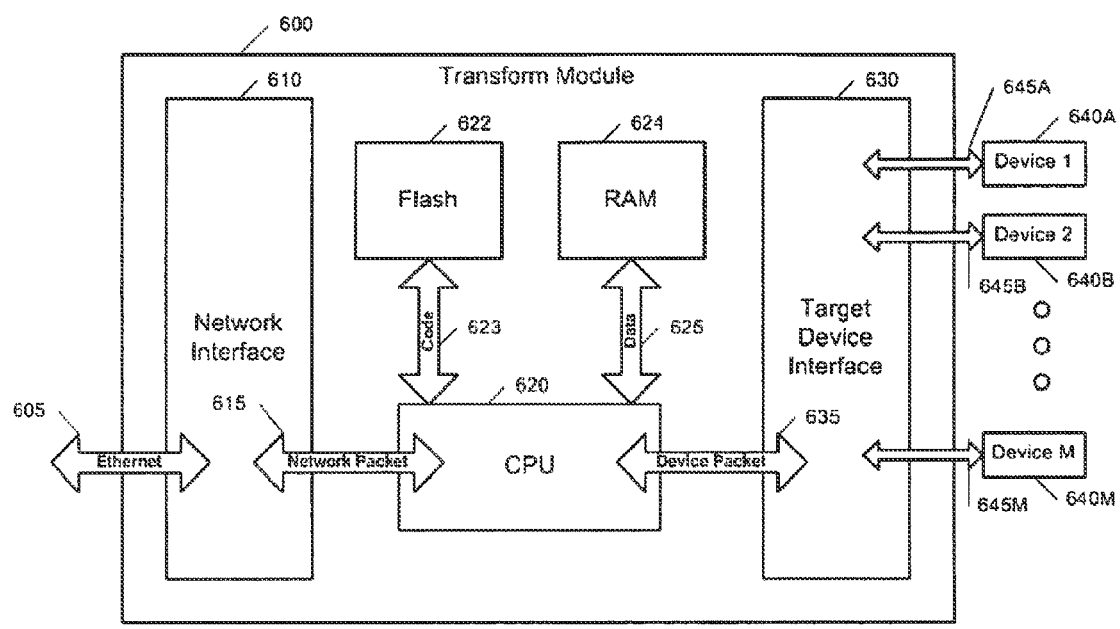
FIG. 6 is a schematic of a possible block level physical representation of a module.

FIG. 6 illustrates a possible physical embodiment of a module 600. Information packets from external to module 600 flow bi-directionally through network communication path 605 to network interface 610. Network interface 610 also provides a network packet path 615 from network interface 610 to CPU 620. CPU 620 executes any combination of software code or firmware core to support the logical structures within module 600. CPU 620 loads executable code instructions from flash 622. It is contemplated flash 622 serves many uses including code storage, module configuration storage, local file systems, or other uses pertaining to persistent data storage where CPU 620 uses code path 623 to write or read from flash 622. Although the word "flash" is used, one ordinarily skilled in the art of developing embedded systems will recognize any type of persistent or non-volatile memory can be used to serve the same purpose including a hard disk drive. For modules that need extreme high performance, it is contemplated CPU 620 can represent multiple actual processors. Contemplated modules with multiple processors include rack mount systems providing storage arrays. As CPU 620 executes module 600 code, system data is storage and retrieved from RAM 624 via data path 625. CPU 620 utilizes device data path 635 to interact bi-directionally with target device interface 630. Target device interface 630 also provides bi-directional paths 645A through 645M for device data for each target device 640A through 640M. Contemplated target device interfaces including backplanes for enclosures capable of supporting many target devices.

A preferred network interface 610 comprises the use of Ethernet to exchange packets. Because modules are contemplated to exist in a wide variety of networking environments, wired or wireless interfaces are contemplated. Preferred wireless interfaces include all forms of 802.11, Ultra Wide Band (UWB), WiMAX, HomeRF, HiperLAN, Bluetooth, IrDA, or other wireless networking technologies existing now or in the future. Contemplated wired interfaces include Ethernet supporting various speeds including 10 Mbps, 100 Mbps, 1 Gbps, 10 Gbps, or higher speeds. In addition, contemplated network interface 610 can comprise more than one physical channel for various reasons including to increase performance, to provide out-of-band management, to provide out-of-band module to module communication similar to an internal bus or backplane, or to provide logical separation of decentralized capabilities or services.

Preferred embodiments of target device interface 630 include any combination of homogenous or heterogeneous wired interfaces including serial or parallel interfaces. In addition, target device interface 630 comprises the capability of interfacing to one or more target devices. Yet more preferred embodiments of target device interface 630 include serial interfaces including RS-232, RS-485, RS-422, USB, Firewire, Ethernet, USB, or even programmable 10 pins for low level devices. Yet even more preferred serial interfaces include SATA, or fiber channel interfaces. Contemplated parallel interfaces include SCSI, PATA, PCI, or PCI-like interfaces. Beyond wired interfaces, it is also contemplated that target device interface 630 can employ wireless interfaces including Bluetooth, IrDA, or even 802.11 wireless communications. In some embodiments, target device interface 630 can comprise API to access functionality of a larger system.

When implemented on a hardware platform for use with physical target devices 640A through 640M, module 600 includes a number of other components in order to support the overall functionality of the module. Those ordinarily skilled in the art of embedded systems or software development will recognize the standard components usually employed when creating such modules. The components include an embedded real-time operating system, TCP/IP stack, file system, web server for use as a user interface, or other middleware. Security for confidentiality, integrity, or authentication can be handled through the use of protocols including IPSec, VPNs, SSL, SSH, RADIUS, Kerberos, or other security systems as they gain currency. Additional hardware components might also be necessary, including clocks, internal buses, transceivers, or others. When module 600 comprises all software for computing systems including Windows® or Linux, the module will interface to elements within the computing system via a set of APIs, where the hardware associated with system is part of a generalized computing platform. Specifically contemplated implementations of modules include programmable gate arrays, ASICs, embedded boards that attach directly to target devices, back planes, rack-mount systems, or even software components.

Virtual Bus Tunnel

Figure 7A:
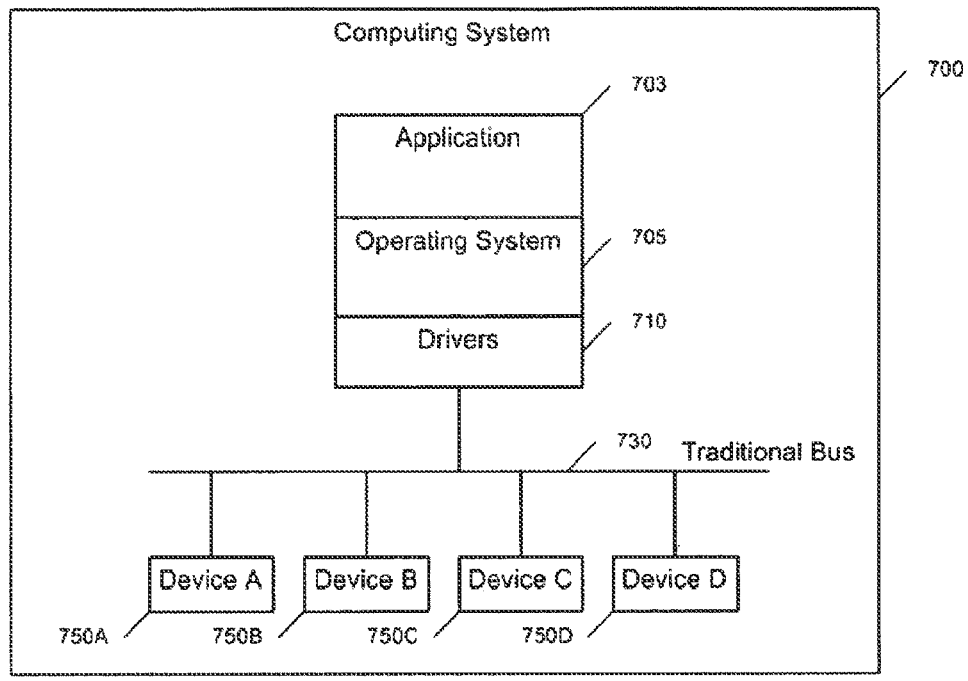
FIG. 7 is a schematic of a representation of a virtual bus tunnel providing communication among devices external to a computing system.
Figure 7B:
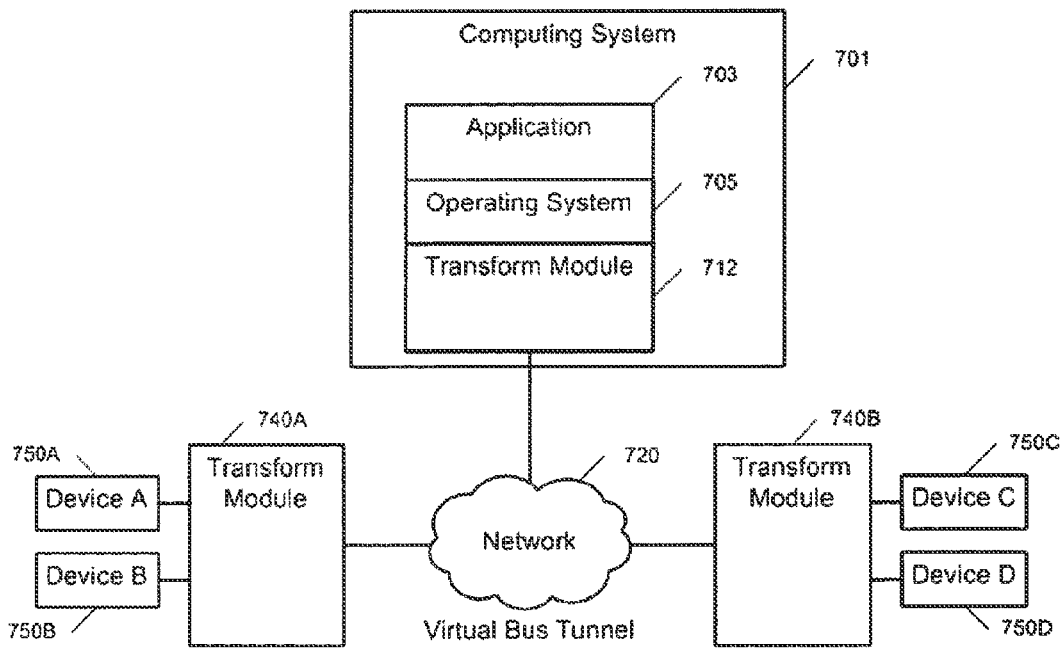

FIG. 7 illustrates a comparison of a traditional computing system in FIG. 7A and a decentralized computing system utilizing modules comprising virtual devices in FIG. 7B. Referring to FIG. 7A, computing system 700 comprises application 703 which requires a generalized operating system 705 including Windows® or Linux to function properly. When application 703 accesses system resources including hard drives, monitors, memory, network, or other localized devices the application makes API calls through operating system 705 to driver 710. Driver 710 then accesses a localized system bus to send to or receive information packets with device format from any of devices 750A through 750D.

FIG. 7B depicts a similar computing system 701 with the exception that module 712 replaces driver 710. Module 712 provides access to network 720 used for the virtual bus tunnel. As application 703 requests support from devices, application 703 again calls through operating system 705 which then makes device level requests through module 712. Module 712 transforms the packets with a device format from operating system 705 to a packet with a split-ID format or a contiguous-ID format destined for a remote device connected to module 740A or 740B. Modules 712, 740A, and 740B, utilize a preferred embodiment of a virtual bus tunnel which comprises the functionality that allows the objects within the modules to communication with each other via information packets. Using module 712 allows the operating system to perceive devices 750A through 750D as if they are locally connected. Moreover, device 750A through 750D can appear as a single device if they have been aggregated. In addition, modules 740A and 740B allow devices 750A through 750D to perceive they connect directly to a real bus.

Network 720 comprises the virtual bus tunnel within modules 712, 740A, and 740B. Each virtual bus tunnel provides an addressing mechanism and a data transport mechanism. The addressing mechanism comprises a number of capabilities: the capability of addressing logical groups of target devices or virtual devices such that they can be addressed by a single point address, the capability of addressing individual target devices or virtual devices, or the ability to address specific characteristics associated with target devices or virtual devices. The virtual bus tunnel does not necessarily tunnel device data because device formats from one module to another can vary widely. Group level addressing allows multiple logically separate systems to utilize the same physical transport media as a virtual bus. For example, if a target device happens to be a CPU, multiple users access the CPU via different group IDs, where each group ID represents one user's decentralized computing system. The data transport mechanism comprises that ability to transfer and route information packets from system to system until the information packets reach their final destination. A preferred virtual bus tunnel comprises an internetworking protocol which provides addressing capabilities and data transport capabilities. Specific contemplated internetworking protocols include IPv4 or IPv6. Even more preferred virtual bus tunnels comprise logical groups of objects within modules and optionally objects from other modules addressed via multicast IP addresses.

IP Multicasting—Mirrors, Stripes, and Spans

Figure 8:
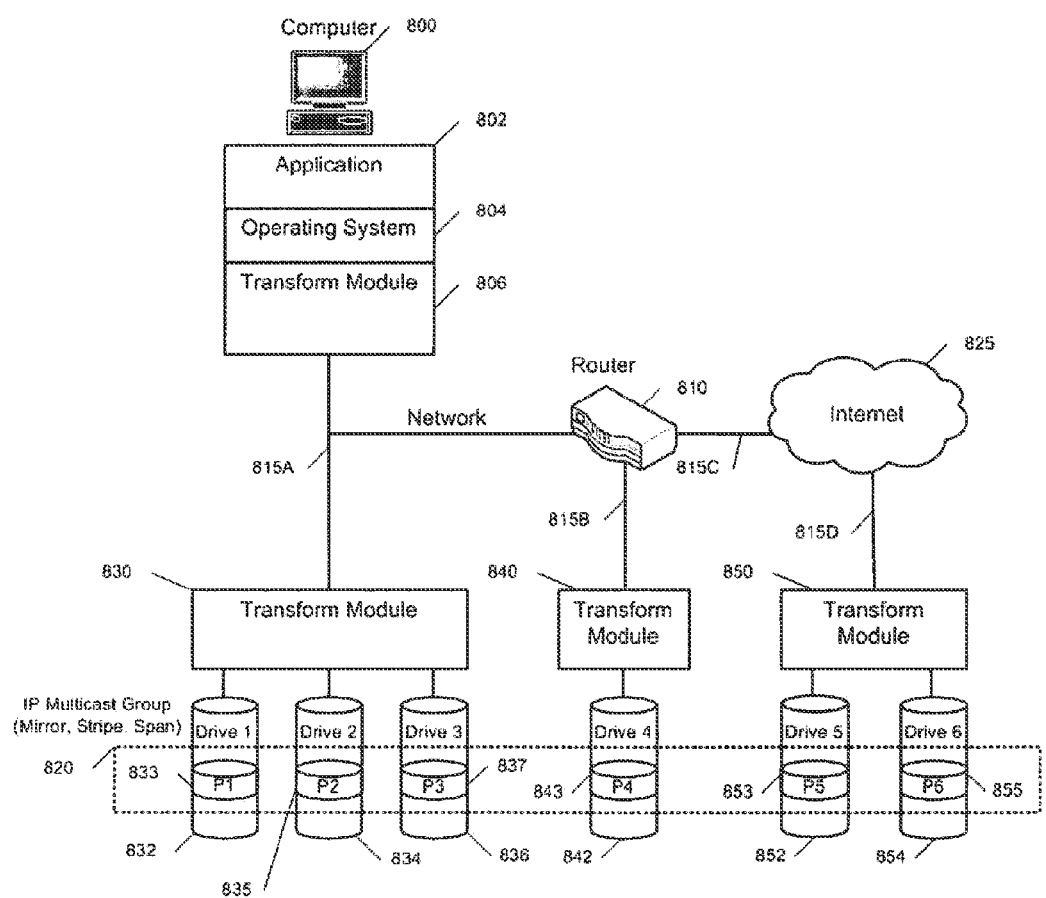
FIG. 8 is a schematic of a possible embodiment of a virtual bus tunnel used to create data mirrors, stripes, or spans from partitions on hard drives located in different physical locations.

FIG. 8 provides an illustration showing a possible embodiment where a user operating computer 800 could access data across a number of decentralized hard disk drives but have their capabilities or services aggregated via modules. Drives 832, 834, and 836 attach to module 830, drive 842 attaches to module 840, and drives 852 and 854 attach to module 850. Each of the drives further comprises logical partitions located on each of the drives: drive 832 comprises logical partition 833, drive 834 comprises logical partition 835, drive 836 comprises logical partition 837, drive 842 comprises logical partition 843, drive 852 comprises logical partition 853, and drive 854 comprises logical partition 855. Collectively, modules 830, 840, and 850 comprise virtual devices that aggregate the logical partitions to form multicast group 820. From the perspective of the user or application 802, the aggregated logical partitions represented by multicast group 820 form a single disk volume that appears as a single hard disk drive. As a user operates application 802 on computer 800, the application can request data from a hard disk drive through operating system 804. Operating system 804 perceives the data as residing on a single hard disk drive device and thereby requests data though module 806. Data requests in the form of information packets comprising split-ID or contiguous-ID format travel across a network 81 SA through 81 SD which can optionally include a number of routers such as router 810 or even can optionally include Internet 825. Data requests are received by modules 830, 840, and 850. The modules 830, 840, and 850 determine if the requests need action based on the target hard disk drives attached to the modules, the host address in the information packet, and LBA within the packet. Although FIG. 8 presents a possible configuration of modules and target devices, one ordinarily skilled in the art will recognize that any possible configuration of computers, network, modules, or target devices are possible while keeping within the scope of the presented subject matter.

Within the example presented in FIG. 8, modules 830, 840, and 850 provide host addresses for all objects associated with the modules including the target hard disk drives as well as logical partitions associated with each of the hard disk drives. Within this context, the logical partitions represent virtual devices. Multicast group 820 represents a possible virtual bus tunnel for the logical partitions such that the logical partitions, modules, or applications coordinate their behaviors. It is specifically contemplated that logical groups of logical partitions on storage devices form multicast mirrors, stripes, or spans. Therefore a logical group is one or more logical partitions. One or more logical groups can then combine to form a logical volume that appears as a single disk to a computer system.

Although a preferred embodiment of multicast group 820 utilizes IP multicasting to address logical groups of virtual devices, alternative embodiments are possible. For example, hosts can employ broadcasts on a subnet to address a logical group wherein the broadcast packets include a group ID representing the logical group. Members in the group use the group ID to determine if the packet should be accepted. Even though this document contemplates the use of IP multicasting to provide group addressing, all possible alternative group addressing based on a group IDs are also contemplated, specifically contemplated group addressing includes the ability to route across subnets. Therefore, "multicast" includes the concept of alternative logical group addressing.

Multicast Spans

A logical group of logical partitions form a multicast span similar to that represented by multicast group 820. Modules, virtual devices, or target devices join a multicast group represented by a single IP address, or group ID, where virtual devices are logical partitions on target hard disk drives. The single IP address represents a group ID that identifies a single logical volume. As an example, a single logical group can form a single spanned logical volume, as called a multicast stripe, identified by the group ID. Data spans across the logical partitions spread across plurality of drives such that the total available storage capacity can be extended beyond that provided by a single drive. In a multicast span, LBAs are distributed sequential from 0 to a maximum number. Each logical partition is responsible for a range of LBAs and each subsequent logical partition continues the LBA numbering sequence where the previous logical partitions left off. Logical partitions can cover an entire drive; however, logical partitions in a span can be of any size.

When a host wishes to send or retrieve data from the multicast stripe, the host sends a request to the multicast group via packets with a split-ID or contiguous-ID format containing the IP address of the group as well as the LBA associated with the data. All virtual devices, or logical partitions, within the group receive the information packet via their modules. The logical partitions determine if they are responsible for that particular data block as determined by the LBA. If a logical partition is not responsible for the data block, the information packet is silently discarded. If a logical partition is responsible for the data block, the information packet format will be transformed. On a write, the packet format will be changed to device format and the data will be written to a target disk. On a read, an information packet will be read from a target disk and transformed to split-ID or contiguous-ID format then sent back to the originating host. A response information packet can contain data, an error, or an acknowledgement. The host expects one response to its request to a multicast stripe.

Multicast Stripes

Multicast stripes are similar to multicast spans with the exception that a number of logical partitions spread across numerous drives to provide increased performance when reading data from the drives. In this sense, multicast stripes are a super-set of multicast spans where the partitions can be any size, not just the size of the hard disk drive.

Referring to FIG. 8, the logical group of logical partitions represented by multicast group 820 forms a striped logical volume, also called a multicast stripe. The logical partitions within the multicast stripe respond identically to host requests as the logical partitions within a multicast span. However, LBAs within a multicast stripe are distributed differently than in a multicast span. In a multicast stripe, LBAs are distributed in blocks laterally across the logical partitions such that the logical volume has a complete set of LBAs from 0 to a maximum value, but each logical partition does not have sequential LBAs. For example in a three partition multicast stripe comprising logical partition 833, 835, and 837 with a LBAs 0 through 29, logical partition 833 could be responsible for LBAs 0 through 4 and LBAs 15 through 19. Logical partition 835 could be responsible for LBAs 5 through 9 and LBAs 20 through 24. Finally, logical partition 837 could be responsible for LBAs 10 through 14 and LBAs 25 through 29. As data is written to the multicast stripe, the first blocks of data are written to partition 833, and then the second blocks of data are written to 835, and so on. Once blocks of data have reached logical partition 837, the pattern repeats back at logical partition 833. As in multicast spans, a virtual device representing a logical partition uses the LBA within the split-ID or contiguous-ID to determine where the data should reside. The previous example is to provide an illustration of how data can be written to multicast stripe and should not be considered restrictive to the presented subject matter. The depth of the data stripes, the number logical partitions, or placement of the physical disks are arbitrary.

Multicast Mirrors

Multicast mirrors can be constructed in a similar fashion as multicast spans and multicast stripes with the exception that there can be multiple logical groups that duplicate data. Consequently, a mirrored logical volume, also called a multicast mirror, comprises more than one set of LBAs numbered from 0 to a maximum value. Multicast group 820 can represent a multicast mirrored volume where some logical partitions mirror data from other logical partition. When a host sends information packets to the multicast mirror, more than one logical partition can be responsible for the data's LBA. Consequently, the host expects more than one response from the multicast mirror. Therefore, the main different between a multicast mirror and multicast stripe or span is that the originating host can expect more than one response to a request.

It is contemplated that multicast mirrors, stripes, or spans can all coexist with each other where each can have their own multicast IP address allowing them to provide services to numerous remote hosts. It is also contemplated that the partitions that make up multicast mirrors, stripes, or span communicate with other partitions within other modules. Such communication allows for each type of volume to work together to provide enhanced abilities including data redundancy.

RAID Structures

In especially preferred embodiments, multicast spans, stripes, or mirror form RAID-like structures. Multicast stripes represent RAID level 0 where data is striped across numerous physical drives. Multicast mirrors represent RAID level 1 where data is mirrored from a primary source to a mirrored volume. By combining multicast mirrors, stripes, or spans along with other RAID concepts including parity, more complex RAID structures are possible, RAID-5 for example. One ordinarily skilled in the art of RAID system is able to build such systems.

Virtual Bus Tunnel Method

Figure 9:
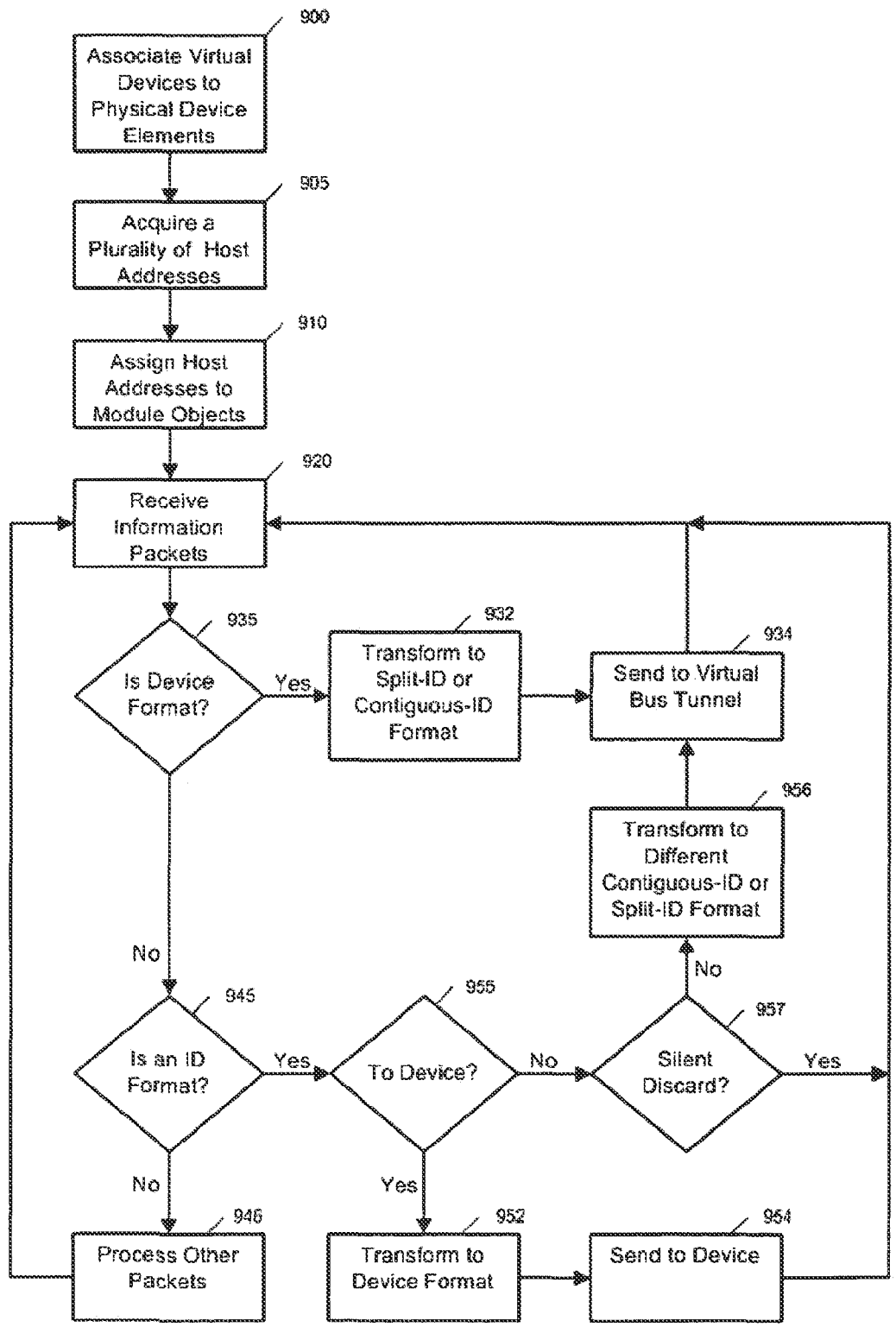
FIG. 9 is a schematic of a possible set steps used to create a virtual bus tunnel.

FIG. 9 depicts a possible method providing a virtual bus tunnel for virtual devices or target devices via modules.

Beginning at step 900, a module associates virtual devices with target device and their capabilities or characteristics. Virtual devices can be logical constructs that can be governed by software. Once the virtual devices are instantiated, whether in software or hardware, they are ready to begin performing their tasks and to communicate with other virtual devices. For example, in a distributed storage system logical partitions are associated with physical disk partitions. Once established, the logical partitions are able to able to participate with other virtual devices over a virtual bus tunnel.

At step 905 a module acquires multiple host addresses. The acquisition can be performed in a number of different possible ways. One contemplated method for acquiring host addresses includes using external module mechanisms including DHCP requests to gain a number of IP addresses from a DHCP server. Additional contemplated methods for acquiring IDs includes using internal module mechanisms including Auto-IP or having the host addresses pre-determined via initial configuration at manufacturing time or subsequent configuration during deployment. Host addresses combine with other ID information to eventually form split-IDs or contiguous-IDs.

At step 910 a module can assign the acquired host addresses to various objects associated with the module. Contemplated objects include real or virtual objects. Real objects include the module itself, interfaces, target devices, chassis, power supplies, or other physical devices that can be referenced by an external host. Virtual objects include virtual devices within the module, virtual bus tunnel, multicast mirrors, multicast stripes, multicast spans, logical volumes, logical groups, logical partitions, or other virtual systems providing capabilities or services to remote hosts.

At step 920 a module waits for information packets to arrive from any source including a target device interface, a network interface, virtual devices within the module, or other sources internal or external to the module. Contemplated information packets include packets with split-ID format, contiguous-ID format, or device format, where preferred embodiments use host addresses that comprise IP addresses.

At step 935 a module determines if an information packet has device format. If the packet does have device format, the module takes action on the packet at step 932 to transform the packet to use split-ID or contiguous-ID format. The transformation can be governed by a virtual device's functionality. Once the transform is complete, the packet is sent over a virtual bus tunnel at step 934. A preferred virtual bus tunnel in step 934 groups virtual device or target devices via multicasting groups to provide a single point contact for communication. Furthermore, a preferred media comprises Ethernet based media to transport packets over a network. Once the packet has been sent at step 934, the module again receives packets at 920.

If step 935 determines the information packet does not have device format, then at step 945 a module determines if the packet is an ID packet comprising a split-ID or contiguous-ID. If the packet is an ID packet, then step 955 determines if the packet is destined to travel to a target device. If so, the packet is transformed to a packet with device format at step 952 where all ID information and packet contents help determined the final transformation. At step 954, the final packet is sent to the target device. If at step 955 the packet is not destined for a target device, then the module determines if the packet is silently discarded or is transformed at step 957. If step 957 determines the packet must be silently discarded, as in the case of multicasting mirroring, striping, or spanning, then the packet is discarded and the module again waits to receive new packets back at step 920. Otherwise, if step 957 determines the packet must not be silently discarded, the packet is further transformed to a different ID format 956 and sent on via step 934. A contemplated use for this type of transform includes a virtual device representing a multicast stripe that can copy data directly to a multicast mirror without having a source host perform multiple operations to create data redundancy.

If at step 945 the received packet is not an information packet from the device or has a split-ID or contiguous-ID, the module processes 946 the packet in a manner that is determined by the programming of the module. Contemplated additional processing includes handling configuration information for target devices, managing virtual devices, updating firmware, or other support processing.

One ordinarily skilled in the art of developing software or embedded systems will recognize the above outlined method and module can be implemented in many different ways in order to optimize various aspects of a module. Implementations include providing a single monolithic processing image to ensure very fast processing or providing multiple threads or tasks that replicate the method presented above for each target device or for each virtual device to simplify the implementation.

Example Use—Data Storage

Specific data storage examples have already been presented; however, a more focused look at employing modules within data storage will help clarify a possible embodiment of the presented material.

Data storage products can be advantageously developed based on modules and hard disk drives. A possible goal is to create a network storage system. Users and applications can access the data store where data is spread over multiple hard disks located remotely from the user over a network in a manner that appears to be a single drive.

At least two types of modules are contemplated. One type attaches directly to the set of hard disk drives, and establishes a set of logical partitions all addressable via IP addresses. The logical partitions then can form a multicast group that presents the collection as a single disk volume to remote hosts. The second type is a software driver installed on a computer system. The computer's module presents its target device interface to the computer's file system. In addition, it is also is able to communicate to the multicast group. Under this case, split-IDs comprise IP addresses and LBAs. The virtual bus tunnel comprises the use UDP datagrams over an IP based Ethernet network. If the modules are constructed properly, then the system can process data at line-rates with respect to the network or the disk drive interfaces.

Consumer oriented systems can be advantageously developed where one or two drives have their capabilities aggregated. A consumer installs a module drive on their PC that can connect to the modules for the drives. Most consumer NAS products suffer from performance problems; however, a module based version allows for perform at line-rates. For enterprise level system, many drives can be combined within a rack-mount enclosure where all drives can be combined in numerous ways to enhance performance, reliability, or scalability. Because the module is virtualized, a user will have unprecedented control over their storage configuration.

The advantage this approach has over traditional NAS and SAN approaches are several fold. First, the module approach utilizes existing network infrastructure and does not need additional specialized controllers or equipment based on fiber channel or SCSI. Second, network storage systems can be developed on less expensive SATA drives reducing the final costs to an end user. Third, by applying various arrangements of multicast mirrors, stripes, and span data redundancy and reliability can be increased over existing RAID systems due to automatic data redundancy where stripes and mirrors can communicate directly with each other. Finally, because the system utilizes a virtual bus tunnel capable of transporting data anywhere in the work, a user has access to their complete computing experience.

Example Use—Medial Environments

In order to illustrate the broad applicability of virtual devices and virtual bus tunnels an additional example is provided beyond data storage. In the medical environment, a patient can be monitored through the use of virtual bus tunnels created via modules. Under such circumstances modules can take on many forms including adapters to specific equipment, embedded modules within medical devices, or even software database adapters.

Patient monitoring equipment can include blood analyzers, sphygmomanometers, fetal monitors, or other devices attached to patients. Modules can combine to form a multicast group whose address represents a patient ID. Consequently, when any application, doctor, or nurse requires patient data the request is sent to the multicast group and only the relevant device responds. As wireless sensors are deployed in a hospital environment, the need will grow for patient-centric monitoring rather than room-centric monitoring. A module based system has the advantage of allowing all sensors to move with the patient and remain accessible rather than being accessible only in a room. Additionally, modules can take the form of database adapters implemented completely in software where the database adapter module continually updates databases as patient telemetry is received.

As shown with the above examples, the decentralization and virtualization of computing resources offers the ability for users to maintain existing experiences no matter the physical locality of those resources. Although the examples show single applications, all possible extensions to the applicability of modules are contemplated including, but not limited to, the use of modules to provide fully decentralized computing systems where CPUs, drives, memory, or other components are separated from each other. Such a virtual computing system allows a user to access their computer experience from anywhere in the world.

Thus, specific compositions and methods virtual device communications, information packets, and virtual bus tunnels have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method comprising:
    associating, with a processor, a first virtual device with a plurality of storage devices and a second virtual device with a physical device element, wherein the first virtual device is a multicast group of logical partitions distributed over the plurality of storage devices;
    assigning, by the processor, the first virtual device a first host address and the second virtual device a second host address, wherein the first and second host addresses are different network addresses that are both associated with an address that corresponds to a network interface, and wherein the network interface communicatively couples the processor to a network; and responsive to an information packet received from the network interface, the information packet having a control portion including the first host address, routing, by the processor, the information packet to the first virtual device.

2. The method of claim 1, further comprising:
routing the information packet to the first virtual device via a virtual bus tunnel.

3. The method of claim 1, wherein the information packet is a first information packet and the method further comprises:
receiving a second information packet from the second virtual device;
determining that the second information packet has a device format;
configuring the second information packet with a third host address of a third virtual device; and
transmitting the second information packet to the third virtual device via a virtual bus tunnel.

4. The method of claim 1, further comprising:
accessing a localized domain name server system; and
routing the information packet based on said accessing.

5. The method of claim 1, wherein the first and second host addresses are first and second Internet Protocol (IP) addresses, respectively.

6. The method of claim 1, wherein the address that corresponds to the network interface is a frame address and the method further comprises:
receiving a framing packet including the frame address and the information packet.

7. The method of claim 1, wherein the information packet further includes an encapsulated portion having the second host address.

8. The method of claim 1, wherein the first host address is a group identifier and the information packet further includes one or more additional identifiers, the one or more additional identifiers including a device identifier or a target identifier.

9. The method of claim 8, wherein the one or more additional identifiers includes a logical block address.

10. The method of claim 1, further comprising:
generating, based on the information packet, one or more device-level requests that are in a device format compatible with a first storage device of the plurality of storage devices; and
issuing the one or more device-level requests to the first storage device.

11. The method of claim 1, further comprising:
generating, based on the information packet, at least two device-level requests that are in a device format compatible with at least two storage devices of the plurality of storage devices; and
issuing the at least two device-level requests to the at least two storage devices.

12. The method of claim 1, wherein the physical device element is a processing unit.

13. An apparatus comprising:
a network interface having an address and configured to communicatively couple the apparatus to a network; and
a processor coupled with the network interface, wherein the processor is configured to:
associate a first virtual device with a plurality of storage devices and a second virtual device with a physical device element, wherein the first virtual device is a group of logical partitions distributed over the plurality of storage devices;
assign the first virtual device a first host address and the second virtual device a second host address, wherein the first and second host addresses are different network addresses; and
provide an information packet to the first virtual device in response to receiving the information packet from the network interface, the information packet having a control portion including the first host address.

14. The apparatus of claim 13, wherein the first virtual device is an application, a program, a task, a thread, a function, or a device driver.

15. The apparatus of claim 13, wherein the first host address comprises an Internet Protocol address.

16. The apparatus of claim 13, further comprising:
a target device interface that provides access to the plurality of storage devices and the physical device element.

17. The apparatus of claim 16, wherein the target device interface includes a serial AT attachment (SATA) interface, a parallel AT attachment (PATA) interface, a small computer system interface (SCSI), or a fiber channel interface.

18. The apparatus of claim 16, wherein the target device interface is a heterogenous interface.

19. The apparatus of claim 13, wherein the address of the network interface is a frame address and the network interface is configured to receive a framing packet including the frame address and the information packet.

20. The apparatus of claim 13, wherein the information packet further includes an encapsulated portion having the second host address.

21. The apparatus of claim 13, wherein the first host address is a group identifier and the information packet further includes one or more additional identifiers, the one or more additional identifiers including a device identifier or a target identifier.

22. The apparatus of claim 21, wherein the one or more additional identifiers includes a logical block address.

23. The apparatus of claim 13, wherein the processor is further configured to:
generate, based on the information packet, one or more device-level requests that are in a device format compatible with a first storage device of the plurality of storage devices; and
issue the one or more device-level requests to the first storage device.

24. The apparatus of claim 13, wherein the processor is further configured to:
generate, based on the information packet, at least two device-level requests that are in a device format compatible with at least two storage devices of the plurality of storage devices; and
issue the at least two device-level requests to the at least two storage devices.

25. The apparatus of claim 13, wherein the group of logical partitions is a span group, a stripe group, or a mirror group.

26. A non-transitory computer-readable medium having stored thereon, computer executable instructions that when executed cause a module to:
associate a first virtual device with a plurality of storage devices and a second virtual device with a physical device element, wherein the first virtual device corresponds to a multicast group of logical partitions distributed over the plurality of storage devices;
assign the first virtual device a first host address and the second virtual device a second host address, wherein the first and second host addresses are different network addresses that are both associated with an address that corresponds to a network interface, and wherein the network interface communicatively couples the module to a network; and responsive to an information packet received from the network interface, the information packet having a control portion including the first host address, route the information packet to the first virtual device.

27. The computer-readable medium of claim 26, wherein the information packet is a first information packet and the instructions when executed further cause the module to:

responsive to receipt of a second information packet from the second virtual device, determine that the second information packet has a device format;

configure the second information packet with a third host address of a third virtual device; and transmit the second information packet to the third virtual device via a virtual bus tunnel.

28. The computer-readable medium of claim 26, wherein the address that corresponds to the network interface is a frame address and the instructions when executed further cause the module to:

decapsulate a framing packet, which includes the frame address, to provide the information packet.

29. The computer-readable medium of claim 26, wherein the first host address is a group identifier and the information packet further includes one or more additional identifiers, the one or more additional identifiers including a device identifier or a target identifier.

30. The computer-readable medium of claim 29, wherein the one or more additional identifiers includes a logical block address.

31. The computer-readable medium of claim 26, wherein the different network addresses are different network routable addresses.

32. The method of claim 1, wherein the different network addresses are different network routable addresses.

33. The apparatus of claim 13, wherein the different network addresses are different network routable addresses.

* * * * *